(12) United States Patent
Smith et al.

(10) Patent No.: US 7,915,202 B2
(45) Date of Patent: Mar. 29, 2011

(54) CLAY CONTROL ADDITIVE FOR WELLBORE FLUIDS

(75) Inventors: Clayton Smith, Edmonton (CA); Darin Oswald, Edmonton (CA); Michael D Daffin, Edmonton (CA)

(73) Assignee: Weatherford Engineered Chemistry Canada Ltd., Edmonton, Alberta (CA)

(*) Notice: Subject to any disclaimer, the term of this patent is extended or adjusted under 35 U.S.C. 154(b) by 0 days.

(21) Appl. No.: 12/768,618

(22) Filed: Apr. 27, 2010

(65) Prior Publication Data

US 2010/0210484 A1     Aug. 19, 2010

Related U.S. Application Data

(62) Division of application No. 11/426,175, filed on Jun. 23, 2006, now Pat. No. 7,740,071.

(60) Provisional application No. 60/595,350, filed on Jun. 24, 2005.

(51) Int. Cl.
    *C09K 8/575*     (2006.01)
    *C09K 8/04*     (2006.01)

(52) U.S. Cl. ......... 507/129; 507/239; 507/240; 507/248

(58) Field of Classification Search .................. 507/129, 507/239, 240, 248
See application file for complete search history.

(56) References Cited

U.S. PATENT DOCUMENTS

| | | |
|---|---|---|
| 3,710,863 A | 1/1973 | Webster et al. |
| 5,342,530 A | 8/1994 | Aften et al. |
| 5,771,971 A | 6/1998 | Horton et al. |
| 5,887,653 A | 3/1999 | Bishop et al. |
| 7,067,460 B2 | 6/2006 | Summerhill |

FOREIGN PATENT DOCUMENTS

WO     0118147 A1     3/2001

OTHER PUBLICATIONS

Schlemmer et al.; "Progression of water-based fluids based on amine chemistry—Can the road lead to true oil mud replacements?"; 2003 American Association of Drilling Engineers Technical Conference Paper AADE-03-NTCE-36.

*Primary Examiner* — Timothy J. Kugel
(74) *Attorney, Agent, or Firm* — Linda M. Thompson; Sean W. Goodwin

(57) ABSTRACT

A clay stabilizer which is capable of inhibiting swelling in a wide variety of clay types and is also capable of restoring permeability in formations which have previously been damaged by clay swelling. Amine salts of differing molecular weights configurations and ionic strength are combined to provide transport into micropores, mesopores and macropores in the formation and to effect cationic change therein. A poly quaternary amine having a high to very high charge density is added along with lower molecular weight amine salts to substantially permanently exchange cations with the clay in the formation.

18 Claims, No Drawings

US 7,915,202 B2

CLAY CONTROL ADDITIVE FOR WELLBORE FLUIDS

CROSS REFERENCE TO RELATED APPLICATIONS

This application is a divisional application of U.S. patent application Ser. No. 11/426,175, filed Jun. 23, 2006, now U.S. Pat. No. 7,740,071, and claims the benefit under U.S.C. 119 (e) of U.S. Provisional Patent application Ser. No. 60/595,350, filed Jun. 24, 2005, now expired, the entirety of each of which are incorporated herein by reference.

FIELD OF THE INVENTION

Embodiments of the invention relate to systems used to stabilize clays and shales containing clay and more particularly, to the stabilization of clays found in hydrocarbon-bearing shale formations to minimize swelling and migration of fines found therein and to substantially reverse the effects of swelling, if swelling has already occurred.

BACKGROUND OF THE INVENTION

Subterranean formations have tremendous pressures exerted upon them and it is these pressures that can cause major differences between clay/shales and the behaviour of said clay/shales found at different depths, where hydrocarbon production typically predominates. The amount of pressure applied to the clay which results in the thickness of clay platelets is dictated by the amount of overburden that exists above the zone of interest, i.e. the depth of the pay zone in the well.

A single smectite platelet is composed of a central alumina or magnesium layer joined to silica layers. The particle is typically about one nanometer in thickness and up to several nanometers in width. In general, the charge on the molecules that make up the layers of clay platelets line up in such a way so as to have a face of the platelet negatively charged and the edges having a slight positive charge. The overall charge of a clay platelet however is negative.

Charges on the clay platelets permit interaction with dissolved mineral ions in aqueous fluids, both native and non-native to the formation. The net negative charge on a platelet is typically balanced mainly by sodium ions, although other inorganic cations may also be present in minor amounts. The cations, or charge-balancing ions, associate with the platelet faces and are termed "exchangeable" as they can be readily substituted with other cations when presented to the clay platelets. Each macroscopic clay particle is comprised of many thousands of sandwiched clay platelets, each having exchangeable cations and a layer of water therebetween.

When clay and water are mixed, water penetrates between the platelets, forcing them further apart. The cations present at the platelet faces begin to diffuse away from platelet faces. Further, the amount of water contained within the platelets is dependant upon the pressure under which the clay is located, typically the depth of the clay deposit in the subterranean formation.

Typically, freshly deposited clay sediments have a relatively high water content, solids comprising only about 50% of the total volume. However, much of this fluid fills the pore spaces between the particles and is squeezed out rapidly during the initial stages of burial. Below about 500 m, all that remains of the fluid is a few molecular thicknesses of interlayer water, bound to the internal clay surfaces and the cations associated therewith. The interlayer water is expelled upon deeper burial, generally by a combination of temperature and clay diagenesis. Very little fluid remains in clay sediments below about 10 km.

In a typical petroleum-rich sedimentary basin, compacting stress increases at a rate of about $1.5 \times 10^7$ Pa (150 bar) per kilometre, which corresponds to geostatic pressure generated by the overlying sediments and their fluids. In addition, the geothermal temperature gradient is typically about 30° C. per kilometre. These features of buried formations are generally thought to promote differences between the observed behaviour of clay in various oil-producing subterranean formations. Applicant is aware that at least some literature (N. T. Skipper, G. D. Williams, A. V. C. de Siqueira, C. Lobban (University College, London) A. K. Soper, R. Done, J. Dreyer, R. Humphries (ISIS)) indicates that it has been determined through experimentation that the layer spacing in vermiculite clays immersed in water is a function of burial depth. It has been shown that sodium vermiculite collapses from a two-layer hydrate (14.96 Å) to a one-layer hydrate (12.35 Å) at a depth of about 6 km. The reversible dehydration observed corresponds to a loss of one layer of water molecules from between the clay platelets. Thus, it is extremely important to measure the depths at which water is ejected from swelling clays in this way for example, to understand and predict the primary migration of oil and natural gas therein. Primary migration is the process whereby hydrocarbons move from the sedimentary source rocks, in which they were formed, to higher permeability reservoir rocks, from which they can now be extracted.

Production of petroleum hydrocarbons is often troubled by the presence of clays and other fines capable of migrating within the formation. Normally, these fines, including the clays, cause no obstruction of flow to a wellbore via the capillary system of the formation. When the fines are disturbed however, they may begin to migrate within the production stream and, too frequently, encounter constrictions in the capillary, where they bridge off the capillary and severely diminish the flow rate of hydrocarbons to the wellbore.

Further, the introduction of water foreign to the formation, such as introduced through drilling or production processes, has been shown to frequently disturb the fines in these clay-containing formations. The foreign water is often fresh or relatively fresh water compared to brine, which is native to the formation. The change in the nature of the water present may cause the fines to disperse or come loose from adhesion to capillary walls, usually resulting in the migration of the fines through the formation, where plugging can occur in smaller pore throats.

Sometimes the loss of permeability observed is due to clay swelling with the relatively fresh water, without migration. Most often however, clay swelling is accompanied by migration of fines. Non-swelling clays may also respond to the foreign water and begin to migrate. It is believed however that swelling clays are the major mechanism of formation damage due to loss of mobility of hydrocarbon fluids in the formation.

Clay hydration occurs by three mechanisms: surface hydration through bonding of water molecules to oxygen atoms on the surface of the clay platelets; ionic hydration through hydration of interlayer cations with surrounding shells of water molecules; and osmotic hydration which occurs in some clays after they are completely surface and ionically hydrated, usually at 100% humidity.

All clays experience hydration. Illite and smectite clays exhibit varying degrees of ionic hydration. Shale hydration, typically caused by surface adsorption hydration and osmotic absorption hydration, results in two distinctly different problems, one being swelling, which is expansion of the clays due to water uptake and the other being dispersion, which is the disintegration of the shale body due to water contact.

As shale includes non-clay minerals, such as quartz and feldspar, and is typically a heterogenous mixture of clays, a combination of hydration mechanisms may occur in the same piece of rock. For example, the non-clay minerals will not react, the chlorite, kaolinite, and illite clays will hydrate and create solids problems and the smectite clays will hydrate, swell, and react with ionic solutions.

Swelling clays, such as smectites and vermiculites, are layered minerals that are widespread in soils and sedimentary rocks. As previously described, they are made up of negatively charged mica-like sheets which are held together by charge-balancing, interlayer cations such as calcium, magnesium, or sodium. The cations have a strong affinity for polar solvents. For this reason the interlayer regions of smectites and vermiculites tend to expand readily in the presence of water and aqueous solutions. A great deal is known about clay hydration under ambient conditions. In contrast, however, there is little understanding of clay swelling and clay-water interactions under the conditions encountered in sedimentary basins and oilfields.

Drilling shales are susceptible to a variety of problems ranging from washout to complete hole collapse. Shales make up over 75% of the drilled formations and over 70-90% of the borehole problems are related to shale instability. In the past, oil-based muds (OBM) have been the preferred choice for drilling these argillaceous or clayey formations. The application of OBM has previously been justified on the basis of borehole stability, penetration rate, fluid loss, filter cake quality, lubricity, and, temperature stability. More recently, mainly in the last decade, environmental regulations have restricted the use of diesel and mineral oil-based muds, synthetic and ester-based biodegradable invert emulsion drilling fluids.

Water-based muds (WBM) have therefore become attractive alternatives to emulsion systems, both from the cost and the environmental perspectives. Disadvantageously, however, clay-rich rocks, such as shales, tend to expand when in contact with water-based drilling fluids (WBDFs). The expansion of the clay-containing portions of the formation cause instability and collapse of the well-bore which typically costs the oil industry about $2 billion per annum. Current and conventional solutions to the problem include the use of environmentally unfriendly oil-based drilling fluids.

Further, many fluids which are introduced to the formation, such as acidizing fluids, fracturing fluids and the like are water-based or have a significant water content and thus add to the problems of clay swelling.

Historically, the oilfield industry has tried various methods for the control of clay swelling and migration in an effort to reduce the occurrence of formation damage caused by the introduction of foreign aqueous fluids into sensitive formations. It is generally thought that once damage as a result of swelling has occurred it is unlikely that any significant reversal of the damage is possible.

One concept that has been used is to convert the clay from a swelling form which contains sodium to a form comprising other cations which does not swell as much. For example, cations that form relatively non-swelling clays are potassium, calcium, ammonium and hydrogen ions. When a solution of these cations, mixed or individually, flows past a clay mineral, the cations readily replace the sodium ion present in the clay and the clay is transformed to a relatively non-swelling form. One such system is taught in Canadian patent 1,227,744 to Hopkins et al. (Mobil Corporation), wherein it was concluded that the use of acid, potassium, calcium, or ammonium ions to exchange sodium ion was successful in preventing damage to formations susceptible to plugging or disintegrating due to clays in their compositions.

Applicant believes however that the method taught by Hopkins et al and other methods of this type using simple cation exchange have been found to be only a temporary solution to the problem. Native produced brine inherent in the formation quickly re-introduces sodium ions to the clay and the cations which have been used to displace sodium are just as readily exchanged by sodium in the native brine. Thus, the formation becomes susceptible to swelling and migration once again.

Petroleum-bearing, shale/clay mineral zones are usually found at various depths in subterranean formations and each zone has a unique porosity and permeability in its native state. Thus, each zone can be expected to behave differently when exposed to non-native aqueous fluids. Prior art solutions to prevent each of these various clay types from swelling are different, the ability of the various inhibitors or stabilizing agents to migrate into the clay platelets being heavily influenced by the individual molecules molecular weight. Most conventional clay stabilizing agents work on the principle of substitution of sodium in the clay lattice with another cationic species. The cationic species is generally selected such that its radius of hydration is less than that of the sodium ion; resulting in reduced swelling when the clay comes in contact with a foreign fluid. As previously stated, however this type of clay stabilization is typically temporary because the small cations (either Potassium, Ammonium or Tetramethyl Ammonium Chloride (TMAC)), which have been used to replace the sodium cation, are themselves quickly replaced, once flow from the well is re-established.

Others in the prior art have taught methods and systems which are designed to overcome the problems of the impermanence of the solution using simple cation exchange. Some of the prior art proposed solutions include;

Canadian patent 1,097,904 to Anderson et al. which teaches the use of flax seed gum and up to 10,000 ppm of potassium or ammonium cations;

Canadian patent 2,492,797 to Stamatakis et al. which teaches the use of an acid salt of alkaline esters;

Canadian patent 1,092,575 to Rice et al. which teaches the use of aliphatic hydroxyacids with between 2-6 carbon atoms;

Canadian patent 2,106,778 to Thomas et al. which teaches the use of cationic allyl ammonium halide salts;

Canadian patent 1,103,008 to McLaughlin et al. which teaches the use of poly allyl ammonium halide salts;

Canadian patent 2,300,110 Craster et al. which teaches the use of polyols containing at least 1 nitrogen atom preferably from a diamine;

U.S. Pat. No. 5,771,971 to Horton et al. which teaches the use of primary diamine salt with a chain length of 8 or less;

U.S. Pat. No. 5,908,814 to Patel et al. which teaches the use of quaternized trihydroxyalkylamines or choline derivatives; and U.S. Pat. No. 5,342,530 to Aften et al. which teaches the use of quaternary amine-based cationic polyelectrolyte and salt(s). The cation of the salt(s) may be a divalent salt cation, a choline cation, or certain N-substituted quaternary ammonium salt cations.

The use of quaternized polymers have one main advantage over the use of either potassium chloride or amine quaternary monomers in that they are able to provide substantially permanent clay stabilization. The structure of the polymers is such that there are several cationic sites available which are adsorbed simultaneously. Typically, these polymers contain anywhere from 400 to 7500 cationic sites. In order for the polymer to desorb from the clay, all of these cationic sites must simultaneously be displaced. The probability of these occurring is negligible, hence the substantially permanent nature of the treatment.

Prior art clay stabilizing systems are typically directed towards specific clay types. Applicant believes however that due to the heterogenous nature of many hydrocarbon bearing shale/clay formations, the specifically directed clay stabilizing systems are limited in their ability to effectively exchange with sodium ions in clay platelets other than in the formation for which they were designed and do not function in all clay types. Further, prior art products that have limited mobility when exposed to heterogeneous clay-type minerals inhibit their ability to effectively transport to the sites where they are needed. Some of the molecules described in the prior art will become adsorbed on the formation rock and therefore will not be available further back in the formation, such as during fracturing, limiting the resultant inflow because clay minerals encountered by the treatment fluid further from the well bore will be destabilized as the fluid will have lost most of the inhibitor molecules.

Many of the systems described in the prior art are pH sensitive and because they are typically single components, as the pH changes with dilution in the conate water and the like, the pH shifts to a pH at which the component can no longer work efficiently, if at all.

Clearly what is required is a clay stabilizer which is effective in all or substantially all of the clay constituents in a heterogeneous clay/shale formation. Preferably, the stabilizer is a single fluid additive which can be used alone or in combination with other wellbore fluids and which remains effective over a broad pH range.

SUMMARY OF THE INVENTION

A clay stabilizer utilizes a combination of two or more amine salts capable of cation exchange having different molecular weights, molecular configurations and ionic strengths relative to one another so as to provide substantially universal protection against clay swelling regardless the types of clays present in a formation. Further, the clay stabilizer is capable of restoring permeability in formations which have been previously damaged such as through the introduction of untreated or poorly treated water or aqueous-based fluids. The clay stabilizer can be used without the need to determine the clay types in the formation and embodiments of the clay stabilizer may be used in drilling fluids, fracturing fluids, acidizing fluids and other such wellbore fluids. Further, the clay stabilizer can be used alone to treat previously damaged wellbores to restore permeability therein.

In a broad aspect of the invention, the clay stabilizer comprises effective amounts of two or more amine salts capable of cation exchange within the one or more clay types within the formation, each of the two or more amine salt having a different molecular weight and configuration relative to each of the other of the two or more amine salts so as to permit transport into different size pore spaces within the formation; and the balance being water.

In an embodiment of the invention, the formulation comprises an effective amount of one or more low molecular weight amine salts in the range of $C_1$ to about $C_{18}$, particularly a protonated alkylamine or alkylpolyamine such as hexamethylenediamine and a cationic amine such as choline bicarbonate which are transportable into the micropore and mesopore spaces in the formation, and an effective amount of a long chain poly quaternary amine having a molecular weight less than about 5000 atomic mass units and a high to very high cationic charge density transportable into the macropore spaces in the formation. The long chain poly quaternary amine has a large number of cationic sites and is therefore capable of substantially permanent cation exchange with the clay in the formation.

Embodiments of the invention provide advantages over the prior art. The method of inhibition involves the use of an optimal blend of shale/clay stabilizing agents of various types or configurations, ionic charges and molecular weights to meet the needs of the vast majority of heterogeneous formations. The formulation stabilizes most types of clay minerals since it contains stabilization molecules that can exchange with sodium ions in clay platelets of various thicknesses that can be encountered at various depths. The formulation contains components that can provide stabilization for drilling fluids, fracturing fluids and the like where such fluids are required to provide protection for fluids that have migrated or been pushed further into the formation rock. The formulation contains components that have various abilities to migrate into clay mineral formations of varying porosities and permeabilities to provide effective stabilization. The formulation contains components that will provide a combination of temporary and permanent stabilization of shale/clay minerals, thus increasing the likelihood of higher production returns after the job is complete; and provides effective stabilization to most shale/clay minerals that can be encountered at low dosage rates without having to conduct complex analysis to pick the best stabilization product by matching the characteristics of the minerals (i.e. platelet spacing, degree of hydration etc) with the characteristics of typical single component stabilization products (i.e. molecular size, ionic charge, stabilization mechanism).

DETAILED DESCRIPTION OF THE PREFERRED EMBODIMENTS

Embodiments of a unique clay stabilizer comprise a mixture of constituents applicable for use in heterogeneous shale/clay formations to minimize swelling and migration of fines within in the formation.

More particularly, the clay stabilizer is an aqueous-based composition which can be used as an additive in other wellbore fluids or can be used alone as a treatment for the wellbore, typically in a soaking operation. The clay stabilizer comprises effective amounts of two or more amine salts which are capable of cation exchange within one or more clay types that exist in heterogeneous formations. Each of the amine salts are selected to have a different molecular weight molecular configuration and ionic strength relative to each of the other of the two or more amine salts so as to permit transport into different size pore spaces within the formation for effecting the cation exchange therein.

Embodiments of the clay stabilizer are particularly useful because the types of clays which exist in a heterogeneous formation are typically not known and in many cases, treatment of a wellbore to improve production is done without any knowledge of the specific clays present. Due to the different molecular sizes present in the formulation and the ability of each to exchange cations, embodiments of the clay stabilizer provide a substantially universal clay stabilizer for use in a wide variety of homogeneous and heterogeneous clay/shale formations.

In one embodiment of the invention, the clay stabilizer comprises one or more low molecular weight amine salts in a range from $C_1$ to about $C_{18}$ which are capable of transport and cation exchange within small (micropore) and intermediate (mesopore) pore spaces in the formation. The low molecular weight amine salts may comprise at least one small molecular weight amine salt having from 1 to 2 carbon atoms. Further, the clay stabilizer typically has at least one low molecular weight amine having a molecular size being up to about one order of magnitude greater than that of the 1-2 carbon amine salt. Typically embodiments which incorporate two or more small molecular weight amine salts can be used in any aqueous wellbore fluid, including drilling mud.

In one embodiment, the formulation may comprise a low molecular weight cationic amine, typically having a small number of carbon atoms, preferably $C_1$ or $C_2$, but which can include any of the following and mixtures thereof and which readily migrate into at least small (micropore) to intermediate (mesopore) pore spaces: choline bicarbonate or choline chloride, potassium chloride, ammonium chloride, various metal halides, aliphatic hydroxyl acids, low molecular weight alkyl ammonium chlorides and tetramethyl ammonium chloride (TMAC) and the like. Preferably, choline bicarbonate or choline chloride are used.

Further, the formulation may comprise a protonated amine, preferably having from one to about seven available amine groups. More particularly the protonated amine is an alkylamine or alkylpolyamine preferably hexamethylenediamine (HMD) which is particularly useful as it is readily mobile in the micropore spaces due to its relatively linear configuration. The protonated amine is typically from about the same order of magnitude to one order of magnitude greater in molecular weight than the cationic amine.

Optionally, methylamine, butylamine, N-methyl-N-(propyl or isopropyl) amine; N,N-diethyl amine; N-methyl-N-ethylamine; and N,N-dimethylamine, N,N-dimethyl-N-ethylamine and the homologous series of alkyldiamines ranging from ethylenediamine to octamethylenediamine may be used. Further, alkylpolyamines ranging from triamines to heptamines may also be used.

An organic acid, preferably formic acid, is added for pH adjustment of the formulation and is particularly useful in providing pH adjustment for the protonated amine, such as HMD, which are pH sensitive. The protonated amines are capable of cationic exchange only when in the protonated state. A pH of greater than 9.0 was most beneficial in ensuring protonation and in preventing clay hydration, however formulations have been prepared in a range of from about pH 4 to about pH 11 by adjusting the concentration of the protonated amine in the formulation. Mineral acids may be used as well, although the pH is more difficult to control. Other acids which may be used include, but are not limited to, acetic acid, glycolic acid, propionic acid, malic acid, citric acid, phosphoric acid, sulphamic acid and hydrochloric acid.

Additionally, the formulation may comprise substantially any long chain poly quaternary amine having high to very high cationic charge density and having a molecular weight of less than about 5000 atomic mass units and which is easily soluble in aqueous fluids. The poly quaternary amine typically has a molecular weight of at least 2 to 3 orders of magnitude greater than that of the cationic amine. The long chain cationic polymers provide migration into relatively larger or macro pore spaces. The structure of the poly quaternary amines are such that there are a plurality of cationic sites available which are adsorbed simultaneously to the clay surface. In order for the poly quaternary amine to desorb from the clay, all of the cationic sites must simultaneously be displaced. The probability of these occurring is negligible, hence creating a substantially permanent cation exchange at the clay surface.

The cationic polymers could include, but are not limited to, polydimethyldiallyl ammonium chloride or more generally any cationic poly quaternary amine formed by the condensation of dimethylamine with epichlorohydrin or any cationic poly quaternary amines that contain a large number (>200) of quaternerized nitrogen atoms. In one embodiment, the long chain polymer is a poly quaternary amine such as CALLAWAY 4015™, obtained from Vulcan Performance Chemicals.

Typically clay stabilizers according to embodiments of the invention to be used in drilling fluids will not contain the poly quaternary amines as drilling mud often contains highly anionic species which are not compatible therewith. Instead a protonated polyamine, such as tetraethylene pentamine which has multiple cationic sites, a relatively large structure and limited mobility, is used to achieve relatively the same function as the poly quaternary amine, but which is compatible with the highly anionic species present in most drilling fluids.

Embodiments of the clay stabilizer which include the poly quaternary amines are particularly useful in treating existing wellbores such as with fracturing fluids, acidizing fluids or in a soaking of the formation about the wellbore. Contrary to the general knowledge in the industry, Applicant has noted that when embodiments of the clay stabilizer formulation which comprise the long chain poly quaternary amine are used to treat a wellbore which has already suffered damage as a result of clay swelling, significant improvement in production is achieved. Applicant believes that the significant and substantially permanent restoration of permeability is due to modification of clay swelling which is responsible for the improvement in performance.

EXAMPLES

In one embodiment, the formulation comprises:

| | |
|---|---|
| Water | 43.0-51.0% |
| Ethylene glycol* | 0-8.0% |
| Formic acid, 85% | 10.0% |
| Hexamethylenediamine, 90% | 19.0% |
| Choline bicarbonate(low molecular weight cationic species) | 10.0% |
| Cationic polyquaternaryamine | 10.0% |

All percentages are percent by weight.
*ethylene glycol may be added for winterization.

Example 1

Use of an embodiment of the invention as described above was compared to simple cation exchange using KCl as a method for preventing swelling of clay or shale or reversing damage as a result of using untreated water in a formation. A Capillary Suction Timer test was performed by mixing formation materials with water, both untreated and treated with either an embodiment of the invention or with KCl. The longer the drainage time that was observed, the more swelling and fines migration or formation damage that has occurred. The results of the following tests are found in Table I.

Test A

Synthetic clay was treated with a 3% solution of KCl and with an embodiment of the invention at a rate of 4 $L/m^3$ to illustrate the effect of both on prevention of swelling in the formation.

Test B

The same test was performed as in Test A however the synthetic clay had already been exposed to untreated water to show restoration in drainage using both KCl and an embodiment of the invention.

Test C

Following Test B fresh water was washed through the synthetic clay which had been treated with either KCl or an embodiment of the invention to illustrate the permanence of the restoration of permeability and the potential protective effect of treating a formation with an embodiment of the invention.

TABLE I

|  | Untreated Clay(sec) | Treated with KCl (3%) (sec) | Treated with formulation 4 L/m³ (sec) |
|---|---|---|---|
| Test A Drainage rates | 64 | 13.9 | 11.2 |
| Test B Drainage rates | 64 | 27 | 11.5 |
| Test C Drainage rates | 64 | 38 | 13.1 |

It is clear that the formulation according to an embodiment of the invention was more successful in preventing swelling than KCl. Further, the formulation was capable of reversing damage caused by earlier exposure to untreated water to a greater degree than KCl and the reversing of the damage was substantially permanent compared to KCl, which "washes out" of the formation when presented with additional fresh water.

Example 2

An embodiment of the invention was compared to simple cation exchange using KCl as a method for preventing swelling of clay or shale or reversing damage as a result of using untreated water in a formation. A Capillary Shale Stabilizer Test was performed by mixing formation materials with water, both untreated and treated with either an embodiment of the invention or with KCl. The longer the drainage time observed, the more swelling and fines migration or formation damage that has occurred.

TABLE 2

| Sample | Formulation Treatment (L/m³) | Drainage times (sec) |
|---|---|---|
| Formation material with deionized water only (untreated) | 0 | 83.9 |
| Formation material with formulation | 4 | 10.5 |
| Formation material with formulation | 8 | 9.0 |
| Formation material treated with water (damaged) and then treated with formulation | 8 | 9.7 |
| Anionic foamer 1 added to formulation at 15 L/m³ | 8 | 19.9 |
| Anionic foamer 2 added to formulation at 15 L/m³ | 8 | 20.4 |
| Anionic foamer 1 added to formulation at 15 L/m³ | 4 | 25.0 |
| Anionic foamer 1 added to formulation at 5 L/m³ | 4 | 18.1 |
| Cationic foamer 3 added to formulation at 5 L/m³ | 4 | 10.9 |

Treatment of formation materials using water alone illustrates a large drainage time consistant with swelling and fines migration seen with formation damage. Treatment using an embodiment of the invention alone illustrates significant reduction in the drainage times and therefore a significant reduction in clay swelling both at a high and a low treatment rate. Formation materials which were already exposed to water and which had significant swelling were exposed to the formulation alone. A significant decrease in drainage times was observed indicating a restoration of permeability, likely due to a reversal of swelling.

A variety of foamers were added to the formulation prior to treatment of the formation materials. The addition of anionic foamers generally reduces the permeability, however the addition of a cationic foamer does not affect the restoration of permeability.

Example 3

Silica flour and bentonite were finely ground to less than 100 microns. A slurry was prepared using 5 g ground silica flour, 1.0 g bentonite and 50 mL fluid, the fluid being those listed in Table 3. A capillary shale stabilizer test was performed to determine drainage rates as discussed in the previous examples.

TABLE 3

| Treatment | Drain Time (sec) |
|---|---|
| Untreated water | 64 |
| Formulation 4 L/m³ | 11.2 |
| 15% HCl | 17 |
| 15% HCl and formulation at 4 L/m³ | 15.9 |
| Treated with formulation at 4 L/m³, then mixed with 15% HCl and then washed with water | 31.2 |
| Acid washed material treated with formulation at 4 L/m³ | 10.9 |

It was evident that treatment with acid could displace the clay stabilizer from the clay. Applicant believes that it may be the large excess of hydronium ion which overwhelms the equilibrium. Thus, it is thought that the large volumes of acid used in an acid stimulation might reverse the effects of the clay stabilizer however treatment with clay stabilizer following treatment with acid is capable of restoring permeability, likely by reversing swelling.

The embodiments of the invention in which an exclusive property or privilege is claimed are defined as follows:

1. A clay stabilizer for use in a formation having a mixture of two or more clay types comprising:
   two or more amine salts capable of cation exchange with the two or more clay types within the formation, each of the two or more amine salts having a different molecular weight and charge density relative to each of the other of the two or more amine salts so as to permit transport into different sized pore spaces within the formation for reducing clay swelling therein.
   wherein one of the two or more amine salts is a protonated amine in a range of $C_1$ to about $C_{18}$ having from one to about seven available amine groups; and
   wherein one of the two or more amine salts is a long chain poly quaternary amine having a molecular weight less than about 5000 atomic mass units and having greater than about 200 quaternized nitrogen atoms; and
   the balance being water.

2. The clay stabilizer of claim 1 wherein the two or more amine salts further comprise:
   a cationic amine in a range of $C_1$ to about $C_{18}$ or mixtures thereof so as to provide migration and cation exchange in small pore spaces in the formation; and the long chain poly quaternary amine having a molecular weight less than about 5000 atomic mass units and having greater than about 200 quaternized nitrogen atoms.

3. The clay stabilizer of claim 1 further comprising:
a cationic amine or mixtures thereof so as to provide migration and cation exchange in small pore spaces in the formation;
the protonated amine so as to provide migration and cation exchange within intermediate pore spaces in the formation; and
the long chain poly quaternary amine having a molecular weight less than about 5000 atomic mass units and having greater than about 200 quaternized nitrogen atoms.

4. The clay stabilizer of claim 3 wherein:
the protonated amine has a molecular weight at least one order of magnitude greater than the cationic amine; and
the long chain poly quaternary amine has a molecular weight at least 1 to 3 orders of magnitude greater than the cationic amine.

5. The clay stabilizer of claim 4 wherein the long chain poly quaternary amine is polydimethyldiallylammonium chloride.

6. The clay stabilizer of claim 2 wherein the cationic amine is a saturated quaternary amine.

7. The clay stabilizer of claim 6 wherein the saturated quaternary amine is choline bicarbonate.

8. The clay stabilizer of claim 2 wherein the long chain poly quaternary amine is polydimethyldiallylammonium chloride.

9. The clay stabilizer of claim 1 wherein the pH is adjusted so as to maintain the protonated amine in the protonated state.

10. The clay stabilizer of claim 9 wherein the pH is adjusted using an organic acid.

11. The clay stabilizer of claim 1 wherein the two or more amine salts further comprise:
one or more amine salts in the range of $C_1$ to about $C_{18}$.

12. The clay stabilizer of claim 1 wherein the protonated amine is an alkylamine.

13. The clay stabilizer of claim 1 wherein the protonated amine is an alkylpolyamine.

14. The clay stabilizer of claim 1 wherein the protonated amine is hexamethylenediamine.

15. The clay stabilizer of claim 1 wherein the long chain poly quaternary amine is polydimethyldiallylammonium chloride.

16. A clay stabilizer for use in a formation having a mixture of two or more clay types comprising:
two or more amine salts capable of cation exchange with the two or more clay types within the formation, each of the two or more amine salts having a different molecular weight and charge density relative to each of the other of the two or more amine salts so as to permit transport into different sized pore spaces within the formation for reducing clay swelling therein,
wherein one of the two or more amine salts is a protonated amine having a molecular weight sufficient to permit transport into mesopores in the formation; and
wherein one of the two or more amine salts is a long chain poly quaternary amine having a molecular weight less than about 5000 atomic mass units and having greater than about 200 quaternized nitrogen atoms so as to provide transport into the large pore spaces in the formation and cation exchange therein; and
the balance being water.

17. The clay stabilizer of claim 16 wherein the two or more amine salts comprise:
a cationic amine or mixtures thereof in a range from about $C_1$ to about $C_{18}$ so as to provide transport into micropores in the formation and cation exchange therein;
the protonated amine in a range from about $C_1$ to about $C_{18}$ so as to provide transport into the mesopores in the formation and cation exchange therein; and
the long chain polyquaternary amine having greater than about 200 quaternized nitrogen atoms so as to provide transport into the large pore spaces in the formation and cation exchange therein.

18. The clay stabilizer of claim 17 wherein,
the protonated amine has a molecular weight at least one order of magnitude greater than the cationic amine; and
the long chain polyamine has a molecular weight at least 1 to 3 orders of magnitude greater than the cationic amine.

* * * * *